(12) United States Patent
Raghunath (10) Patent No.: US 10,452,830 B2
(45) Date of Patent: Oct. 22, 2019

(54) AUTHENTICATING USERS VIA DATA STORED ON STYLUS DEVICES

(71) Applicant: Microsoft Technology Licensing, LLC, Redmond, WA (US)

(72) Inventor: Narasimhan Raghunath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/012,943

(22) Filed: Feb. 2, 2016

(65) Prior Publication Data

US 2017/0220789 A1 Aug. 3, 2017

(51) Int. Cl.
| | |
|---|---|
| *H04L 9/00* | (2006.01) |
| *G06F 21/35* | (2013.01) |
| *G06F 3/0354* | (2013.01) |
| *G06F 3/041* | (2006.01) |
| *G06F 21/36* | (2013.01) |
| *G06F 21/33* | (2013.01) |
| *G06F 21/31* | (2013.01) |
| *G06F 21/32* | (2013.01) |
| *H04L 29/06* | (2006.01) |
| *H04W 12/06* | (2009.01) |
| *G06F 3/038* | (2013.01) |

(52) U.S. Cl.
CPC ............ *G06F 21/35* (2013.01); *G06F 3/038* (2013.01); *G06F 3/03545* (2013.01); *G06F 3/0416* (2013.01); *G06F 21/31* (2013.01); *G06F 21/32* (2013.01); *G06F 21/33* (2013.01); *G06F 21/36* (2013.01); *H04L 63/0823* (2013.01); *H04W 12/06* (2013.01)

(58) Field of Classification Search
CPC ...................................................... G06F 21/35
USPC ......................................................... 726/10
See application file for complete search history.

(56) References Cited

U.S. PATENT DOCUMENTS

| | | | | |
|---|---|---|---|---|
| 5,453,762 | A * | 9/1995 | Ito | G06F 3/03545 345/156 |
| 7,426,643 | B2 * | 9/2008 | Homer | G06F 21/32 713/186 |
| 7,593,000 | B1 | 9/2009 | Chin | |
| 8,836,653 | B1 | 9/2014 | Faller et al. | |
| 9,063,576 | B1 | 6/2015 | Kaufman et al. | |
| 2006/0005023 | A1 * | 1/2006 | Homer | G06F 21/32 713/168 |
| 2012/0242603 | A1 | 9/2012 | Engelhardt et al. | |

(Continued)

OTHER PUBLICATIONS

International Search Report and the Written Opinion of the International Searching Authority, issued for PCT Application No. PCT/US2017/013684, dated Apr. 6, 2017, 13 pages.

(Continued)

*Primary Examiner* — Alexander Lagor
*Assistant Examiner* — Syed M Ahsan
(74) *Attorney, Agent, or Firm* — International IP Law Group, P.L.L.C.

(57) ABSTRACT

An example method includes receiving a digital certificate corresponding to a user at a stylus device. The method includes transmitting the digital certificate and associated digital ink data to a touch device to authenticate the user based at least on the digital certificate and the associated digital ink data in response to detecting that the stylus device is within a threshold range of the touch device.

23 Claims, 6 Drawing Sheets

(56) References Cited

U.S. PATENT DOCUMENTS

| | | | |
|---|---|---|---|
| 2013/0106741 A1* | 5/2013 | Pedersen | G06F 3/044 345/173 |
| 2013/0106799 A1 | 5/2013 | Yilmaz et al. | |
| 2014/0038557 A1 | 2/2014 | Kim et al. | |
| 2014/0165012 A1 | 6/2014 | Shen et al. | |
| 2014/0232700 A1 | 8/2014 | Park et al. | |
| 2014/0375573 A1 | 12/2014 | Idzik et al. | |
| 2015/0244423 A1* | 8/2015 | Fujinaga | H04B 5/0031 455/41.1 |

OTHER PUBLICATIONS

R., Deidre, "SAMMOBILE: Signature Unlock for the Galaxy Note 3", Published on: Jul. 30, 2015 Available at: http://www.sammobile.com/2015/07/30/signature-unlock-for-the-galaxy-note-3/.

"Android Guides: How to use smart lock in Android Lollipop?", Published on: Feb. 14, 2015 Available at: http://gadgetguideonline.com/android/lollipop/how-to-use-smart-lock-in-android-lollipop/.

"Microsoft: The Surface touchscreen", Retrieved on: Nov. 23, 2015 Available at: https://www.microsoft.com/surface/en-us/support/hardware-and-drivers/the-surface-touchscreen?ps=windows-10#UseW10.

"How to Setup and Use Motorola Skip with Moto X", Published on: Oct. 2, 2013 Available at: http://motoxhub.com/moto-x-how-to-guide/how-to-setup-and-use-motorola-skip-with-moto-X/.

"Howard Forums", Published on: Oct. 3, 2015 Available at: http://www.howardforums.com/showthread.php/1864130-How-To-Unlock-LG-G4-Stylus-By-Unlock-Code-To-Work-With-Any-Network.

* cited by examiner

AUTHENTICATING USERS VIA DATA STORED ON STYLUS DEVICES

BACKGROUND

Security tokens are used to authenticate or prove an identity of a user of a computing device. Sequence-based tokens generate a sequence of codes, which can be used to add a layer of security to authentication procedures. Using security tokens adds a step to the user and device authentication process, which can include, for example, typing a code or inserting a smartcard. Authentication systems using security tokens, such as sequence-based tokens, can include prompting a user to enter a code retrieved from a hardware token device or software token application as part of the authentication process.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

An implementation provides a stylus device that includes a first module configured to receive and to store a digital certificate corresponding to a user. The stylus device includes a second module configured to wirelessly transmit the digital certificate and digital ink data from the stylus device to a touch device for user authentication on the touch device. The touch device configured to authenticate the user at least based on the digital certificate and the digital ink data.

Another implementation provides a method that includes receiving a digital certificate corresponding to a user at a stylus device. The method includes transmitting the digital certificate and digital ink data associated with the digital certificate to a touch device to authenticate the user based at least on the digital certificate and the digital ink data in response to detecting that the stylus device is within a threshold range of the touch device.

Another implementation provides one or more computer-readable storage devices for storing computer-readable instructions that, when executed by one or more processing devices, instruct the authentication a user via a stylus device, the computer-readable instructions including code to receive a digital certificate associated with a user based at least on detecting that a stylus device is within a threshold distance from a touch device. The instructions can also include code to receive digital ink data associated with the digital certificate. The instructions can also further include code to authenticate the user based on the digital certificate and the digital ink data associated with the digital certificate.

Another implementation provides a computing device for authenticating a user via a stylus device. The computing device includes a first module configured to receive a digital certificate associated with the user and associated digital ink data from the stylus device. The computing device also includes a second module configured to authenticate the user based on the digital certificate and the digital ink data.

BRIEF DESCRIPTION OF THE DRAWINGS

The following detailed description may be better understood by referencing the accompanying drawings, which contain specific examples of numerous features of the disclosed subject matter.

DETAILED DESCRIPTION

In computer technology, a stylus is a writing utensil typically in the shape of a pen that is used to interact with, for example, a touch screen of a tablet computing device. As used herein, a stylus is an input device that can transmit data and control signals to a computing device. A digitizer component on the computing device may be used to determine stylus position and orientation, allowing a user to trace lines. The lines can then be represented as digital ink on a display. The digitizer may also be used to communicate data between the stylus and the computer, such as pressure, battery level, button state, and serial number.

Conventional user authentication in tablets may involve a multi-step, multi-device process. For example, users may currently only login to a tablet device using a type cover. Users may either type a password or login using a fingerprint. Thus, if a user's primary goal is to generate digital ink, the user may first switch between multiple devices just to log in. The techniques described herein can effectively transform a stylus into a user authentication device. Moreover, when a user uses a tablet device as a clipboard, the present techniques can make note-taking on the tablet device both a secure and a seamless experience.

In some embodiments, a stylus device can automatically authenticate a user via a digital certificate corresponding to the user. For example, a stylus can receive and transmit data to authenticate a specific user, thereby protecting against a user with a different stylus from logging in using the digital ink data. Digital ink data, as referred to herein, can include any suitable input provided by a stylus device to a computing device. For example, digital ink data can correspond to signatures, handwritten notes, illustrations, figures or diagrams produced by a stylus device. Typically, sequence-based tokens impose additional authentication burdens on the user, whereas the embodiments described obviate a user's need to type in a code for every authentication, while still providing an additional factor in an authentication procedure.

Automating user authentication is relevant in many applications. In one example, a stylus employing the present techniques can be used to authenticate a user at various devices. Some embodiments may be used to obviate a manual authentication process that could interrupt the inking activity by displaying an authentication screen or dialog box. For example, such manual authentication process may use a keyboard or virtual keyboard. Some embodiments thus allow a computing device to authenticate a user in an automatic and imperceptible, yet secure, manner In another example, a user may interact with a plurality of computing devices with the same personal stylus device. For example, the user may swipe the stylus to begin unlocking a device and draw a picture or signature as appropriate to authenticate and unlock the computing device.

In some embodiments, the stylus can thus be used to provide a second factor for user authentication, independent of an inking activity. Instead of assuming that a stylus is owned by a single user, such that the detection and authentication of a stylus with a unique serial number implies the proximity of its owner, the present techniques can use a digital certificate that is associated with the user. For example, the digital certificate can include user information, such as a name and permissions, and an expiration date. In some examples, the digital certificate can be connected with an online user ID. For example, a user may purchase the stylus while logged in to a website using the online user ID and receive a stylus with a digital certificate corresponding to the online user ID preloaded on storage in the stylus. In some examples, the stylus may be associated with a user ID during an association process upon first connecting the stylus with a tablet device. For example, the tablet device can send a digital certificate including the user ID to the stylus during the association process. A computing device requesting authentication of a user may then request a second factor of authentication, which can be provided by the digital certificate from the stylus. This embodiment could be used to replace or complement other secondary authentication factors, such as those provided by biometrics, smartcards, and other hardware or software token devices. In some examples, a two-factor authentication can be provided by sending data including the digital certificate in addition to a configurable digital ink. For example, the digital ink could be a drawing and/or signature. Thus, the techniques disclosed herein enable an enterprise acceptable level of two-factor authentication while providing a seamless experience for the user. For example, the user may draw a picture or signature on the surface of the tablet after initiating authentication with any appropriate gesture and then be able to take notes right away.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks.

The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media and devices can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Figure 1:
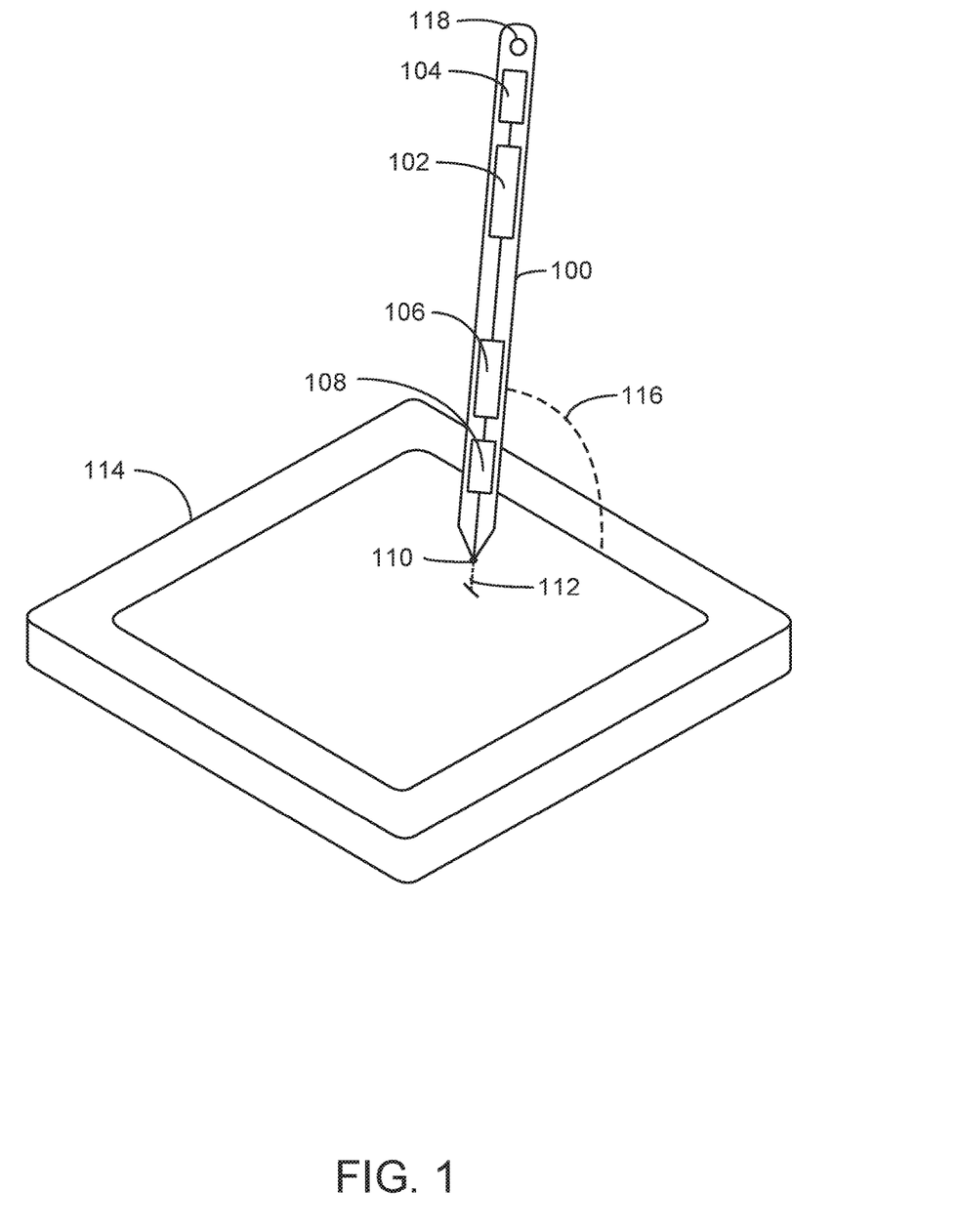
FIG. 1 is a schematic of a stylus device augmented with authenticating hardware and applications on an internal circuit.

FIG. 1 is a schematic of a stylus device 100 augmented with authenticating hardware and applications. The stylus device 100 can be any type of electronic pen or stylus capable of writing on computing devices, such as tablet devices or phones, for example. The circuit 102 within the stylus device 100 can process information, such as, for example, application software for associating the stylus device with a user. The components of the stylus device 100 can be powered by a battery 104, for example. The stylus device can include a storage unit 106 connected to the circuit 102. The storage unit 106 can be either volatile memory or non-volatile memory of any type. The circuit 102 can be connected to a signal transmitter 108 through a cable, bus, or by any suitable means. The signal transmitter 108 can transmit a signal, for example, of arbitrary bit streams, directed through the tip 110 of the stylus device 100 through a digitizer channel 112 to a computing device 114. The digitizer channel 112 can convey information when the tip 110 of the stylus device 100 is within a certain range with respect to the computing device 114.

In embodiments, the digitizer channel 112 is used to convey digital data such as pressure exerted by the tip 110 and power level of the battery 104 of the stylus device 100. The digitizer channel 108 is used to transmit data over a short distance, for example, about 15 millimeters. The digitizer channel 112 is also used to convey data described herein. In some embodiments, the signal transmitter 108 transmits data through a wireless auxiliary channel 116. The wireless auxiliary channel 116 can convey radio waves through Bluetooth Low Energy (BLE), for example, using advertisement frames. An advertisement frame, as used herein, is a frame that is transmitted to allow the existence of a network or device to be discovered, while periodically broadcasting application-specific data payloads. BLE uses little power, allowing the battery 104 to maintain a charge for an extended period of time. Advertisement frames do not require Bluetooth pairing and can thus be received by any Bluetooth host in range. BLE also has a small range for transmitting data, which can provide an additional layer of protection against a potential eavesdropper. In some examples, the digital certificate and the digital ink data can be wirelessly transmitted via a Bluetooth connection.

The circuit 102 is configured to receive data such as a digital certificate corresponding to a user, which can be used to authenticate the identity of a user. Digital certificates can include, for example, a user's name, an online ID, one or more permissions, among other data. In a computing device 114 that is accessed by or within range of multiple styluses, the digital certificates for one or more users may be simultaneously stored and recalled using stylus ID as a unique lookup key. Additionally, the stylus device 100 can store the digital certificate in storage unit 106.

In some embodiments, an association process may be initialized in response to the user pressing and holding a setup button 118 for a time exceeding a predetermined threshold amount of time that is likely not to be the result of an accidental button press. For example, the threshold amount of time can be 10 seconds. Holding the button for longer than the threshold amount of time can instruct the processing circuit 102 to erase a digital certificate previously stored in storage unit 106, receive a new digital certificate from the tablet device, and write the digital certificate to the storage unit 106. The setup process can be concluded by transmitting from the stylus device 100 to the computing device 114 digital ink data to be used for a second form of authentication. For example, the digital ink data can include an electronic drawing or electronic signature that is associated with the digital certificate during the setup process. It will be recognized that the transmission can be arbitrarily deferred with respect to the initiation of the setup process. Moreover, in some examples, the digital certificate can be preloaded on the stylus device. In this case, the setup process may include receiving a digital ink data to associate with the preloaded digital certificate. It is assumed that if this transmission includes secret information, then it occurs over a channel that is deliberately difficult to be monitored by an eavesdropper. In some embodiments, this transmission can occur over the digitizer channel 112, which generally has short range requiring the stylus 100 to be in very close proximity to the computing device 114. For example, the range may be approximately 1.0-2.0 cm. In some examples, the digital certificate and the digital ink data can be wirelessly transmitted as Human Interface Device (HID) packets. In other embodiments, this transmission can occur over a channel encrypted using other methods, which are assumed to be secure. The setup process thus makes the computing device 114 ready for future user authentication via the stylus 100.

In some embodiments, the digital certificate received by the stylus during the security setup may be forwarded by the associated computing device to a cloud service. For example, the digital certificate and/or digital ink data can be transmitted over a network connection, possibly secured by means of encryption. A cloud or cloud service can include multiple servers connected over one or more networks. An authentication service can then be implemented remotely in the cloud, executing the authentication procedure described previously. This may allow any device with a network connection to the cloud service (and not only a specific computing device 114) to forward a received digital certificate and digital ink data to the authentication service on the cloud. The authentication can then respond with a positive or negative authentication of the user.

Embodiments are also possible where the communication channels are bi-directional, allowing the transmitter and receiver agents described herein to be exchanged and the stylus device to authenticate the identity of the user. It is recognized that a bi-directional short-range digitizer channel may allow sensitive data, including digital certificates and digital ink passwords, to be exchanged in both directions during a security setup process, with negligible risk of being obtained by an eavesdropper. Once a setup is complete, a bidirectional long-range and potentially insecure channel can be used for two-way authentication methods.

In some embodiments, the stylus device can also be used for authentication of the user on additional devices. For example, the stylus device can be used to authenticate the user on a phone, laptop, or any other device with a suitable touch display.

It is to be understood that the illustration of FIG. 1 is not intended to indicate that the stylus 100 and computing device 114 are to include all of the components shown in FIG. 1. Rather, the stylus 100 and computing device 114 can include fewer or additional components not illustrated in FIG. 1, e.g., additional applications, additional modules, additional memory devices, additional network interfaces (not shown), and the like. For example, the stylus device may also include a wired connection (not shown). The digital certificate can be received from the touch device via the wired connection during the setup process. For example, the wired connection can be a serial bus or another other suitable connection. In some examples, the wired connection can be on the end of the stylus device. Further, the stylus 100 and computing device 114 are not limited to the modules shown as any combinations of the code used to implement these functions can be implemented. For example, other wireless channels can be used to communicate information from the stylus device 100 to a computing device 114.

Figure 2:
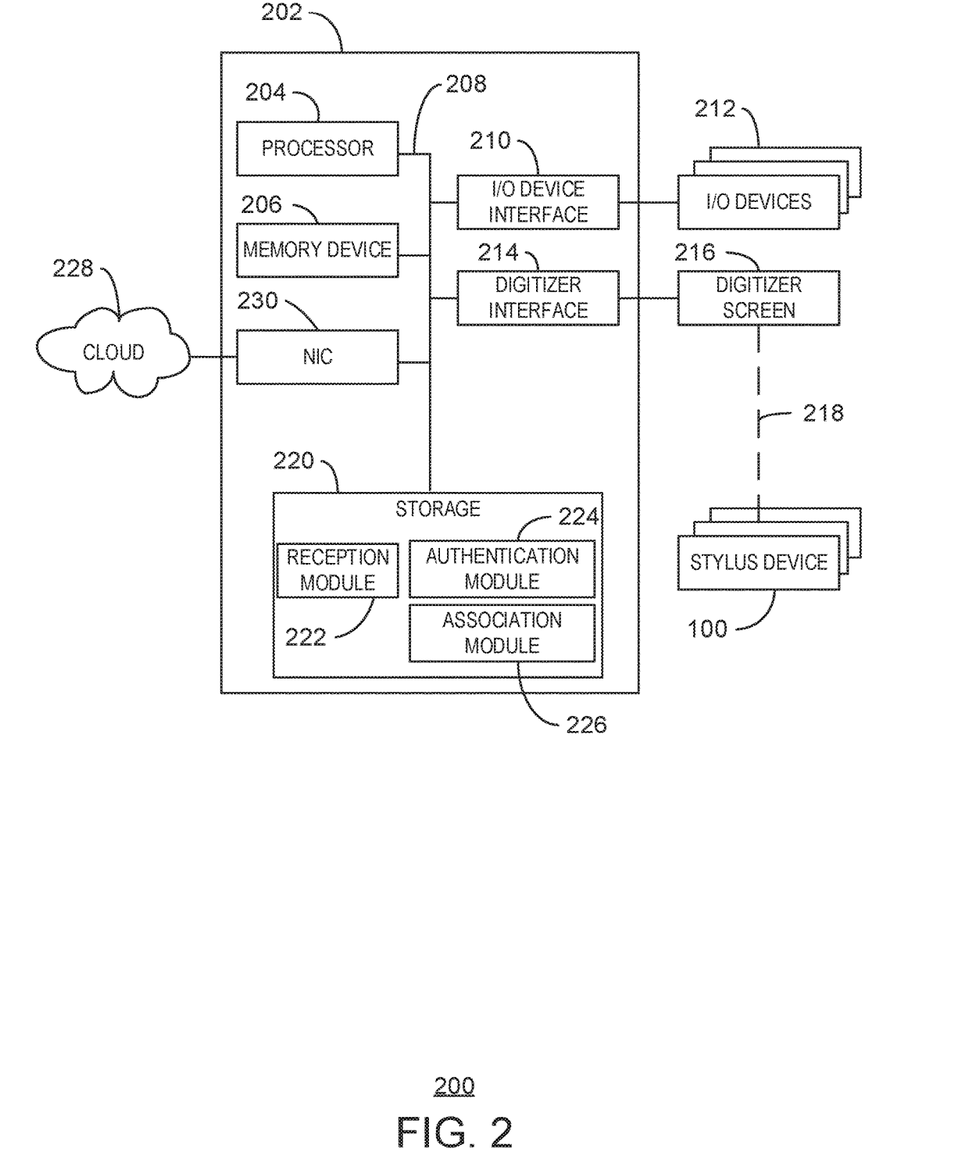
FIG. 2 is a block diagram of an example of a system for authenticating a user via a stylus device.

FIG. 2 is a block diagram of an example of a system 200 for authenticating a user via a stylus device. The stylus device of the system 200 can be, for example, one or more of the stylus device 100 from FIG. 1. The system 200 includes a computing device 202 for interacting with the stylus device 100. In some embodiments, the computing device 202 can be a tablet device, a smart phone, a laptop computer, a personal digital assistant (PDA), or similar device that can interface with a stylus device 100. In some embodiments, the computing device 202 may be a desktop computer, for example. The computing device 202 can include a processor 204 that is adapted to execute stored instructions, as well as a memory device 206 that stores instructions that are executable by the processor 204. The processor 204 can be a single core processor, a multi-core processor, a computing cluster, or any number of other configurations. The memory device 206 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 204 can be used to implement the authentication techniques of a stylus device as described herein.

The processor 204 may be connected through a system bus 208 (e.g., a proprietary bus, PCI, ISA, PCI-Express, HyperTransport®, etc.) to an input/output (I/O) device interface 210 adapted to connect the computing device 202 to one or more I/O devices 212. The I/O devices 212 can include, for example, a camera, a gesture recognition input device, a keyboard, a pointing device, and a voice recognition device, among others. The pointing device may include a touchpad or a touchscreen, among others. The I/O devices 212 can be built-in components of the computing device 202, or can be devices that are externally connected to the computing device 202.

The processor 204 can also be linked through the system bus 208 to a digitizer interface 214 adapted to connect the computing device 202 to receive and interpret information from a digitizer screen 216. The digitizer screen 216 may include a display screen that is a built-in component of the computing device 202. The digitizer screen 216 can also include a computer monitor, television, or projector, among others, that is externally connected to the computing device 202. The stylus device 100 can transmit information through a digitizer channel 218 when the stylus device 100 is touching or within a hover range of the digitizer screen. In embodiments, the hover range for the digitizer channel 218 can be any suitable distance between the tip of the stylus device 100 and the digitizer screen 216, for example, around 10 mm to 20 mm. In some examples, the hover range can be any suitable distance that prevents an intruder in close proximity from intercepting data transmitted via the digitizer channel 218. In other embodiments, when the hover range is exceeded, an auxiliary wireless channel can optionally be used for transmitting the data.

Storage 220 can be coupled to the processor 204 through the bus 208. The storage 220 can include a hard drive, a solid state drive, an optical drive, a USB flash drive, an array of drives, or any combinations thereof. The storage 220 can include a number of modules configured to implement user authentication as described herein. For example, the storage 220 can include a reception module 222 configured to receive and store data transmitted from the stylus device 100. The reception module 222 can receive data such as a digital certificate corresponding to a user. As discussed above, the stylus device 100 maybe preloaded with the digital certificate or may have received the digital certificate during an initial configuration process. The reception module 222 can also receive digital ink data, corresponding to digital ink such as a picture or signature, from the stylus device 100 and store the received digital ink data at storage 220. For example, the digital ink data may have been associated with the digital certificate as discussed below.

The storage 220 can further include an authentication module 224. The authentication module 224 can authenticate the user based on the received digital certificate and associated digital ink data. In some embodiments, the authentication module 224 may begin the authentication process in response to receiving a gesture such as a swipe across the surface of the digitizer screen 216. The authentication module 224 can receive the digital certificate and then prompt for a digital ink password. For example, the digital ink password can be an electronic picture or an electronic signature depending on the initial setup option that was set during setup. The authentication module 224 can then authenticate the user by matching the digital ink password with the digital certificate. In some examples, the authentication module 224 can then unlock the computing device in response to authenticating the user. By using the digital certificate and associated digital ink data from the stylus device 100, the authentication module 224 can avoid using more interposing forms of authentication and thus provide a seamless experience for the user. In some examples, once the user is authenticated, the authentication module 224 can provide instant access to one or more applications of the system 200.

In some examples, an association module 226 can initiate a setup process and send the digital certificate corresponding to the user to the stylus device during the setup process. For example, the association module 226 may initiate the setup process in response to detecting a button press on the stylus for a predetermined amount of time. In some examples, the association module 226 can receive and store digital ink data to be used for user authentication at the touch device and associate the digital ink data with the digital certificate during the setup process.

Also included in the system 200 is a cloud 228 server or network. The cloud 228 can be connected to the computing device 202 by transmitting information through a network interface controller (NIC) 230. The NIC 230 may be adapted to connect the computing device 202 through the system bus 206 to the cloud 228 or network. The network may be a local area network (Ethernet LAN), or a wireless (Wi-Fi) network, among others. In embodiments, the cloud 228 can perform the authentication techniques described with regards to the modules in storage 220, by using the information related to the user.

Figure 3:
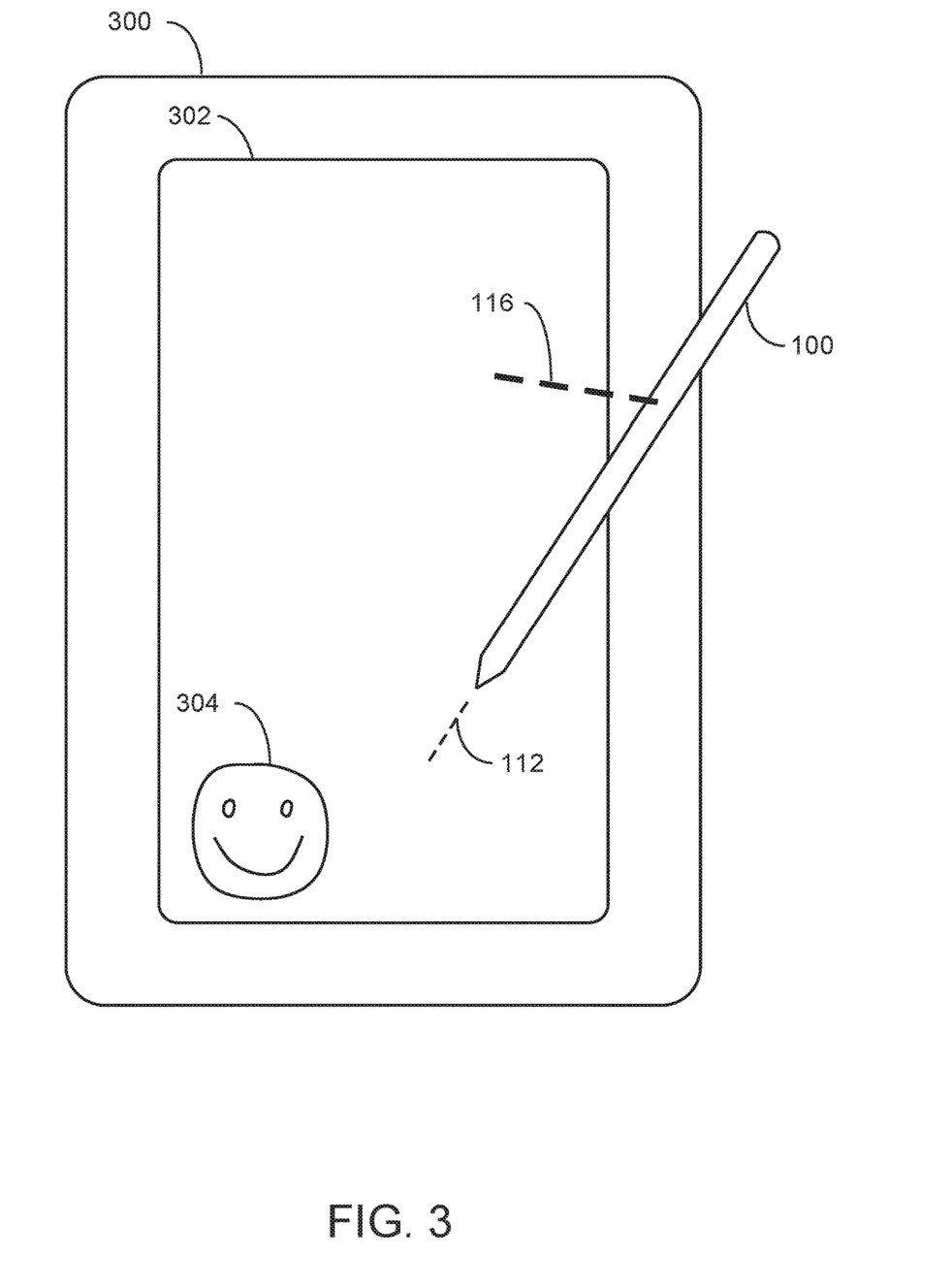
FIG. 3 is a block diagram of an example tablet computing device interacting with a stylus device.

FIG. 3 is a block diagram of an example tablet computing device 300 interacting with a stylus device 100. The tablet computing device 300 includes a touch screen 302. The touch screen 302 in the illustration is displaying an electronic picture 304 that a user has input using the stylus device 100. The picture can be one factor of authentication to access the tablet computing device 300. Through either digitizer channel 108, or wireless auxiliary channel 112, the stylus device 100 can transmit a digital certificate corresponding to the user as a second factor of authentication. This technique enables seamless access for the stylus device 100 to the tablet computing device 300 based on whether the user is authenticated. For example, the tablet may receive a gesture to initiate the authentication process. The gesture can be a swipe with the stylus device 100 across the touch screen 302. The tablet computing device 300 may then prompt for an electronic picture or electronic signature depending on which option was selected during a setup process as discussed further below with reference to FIG. 4.

Figure 4:
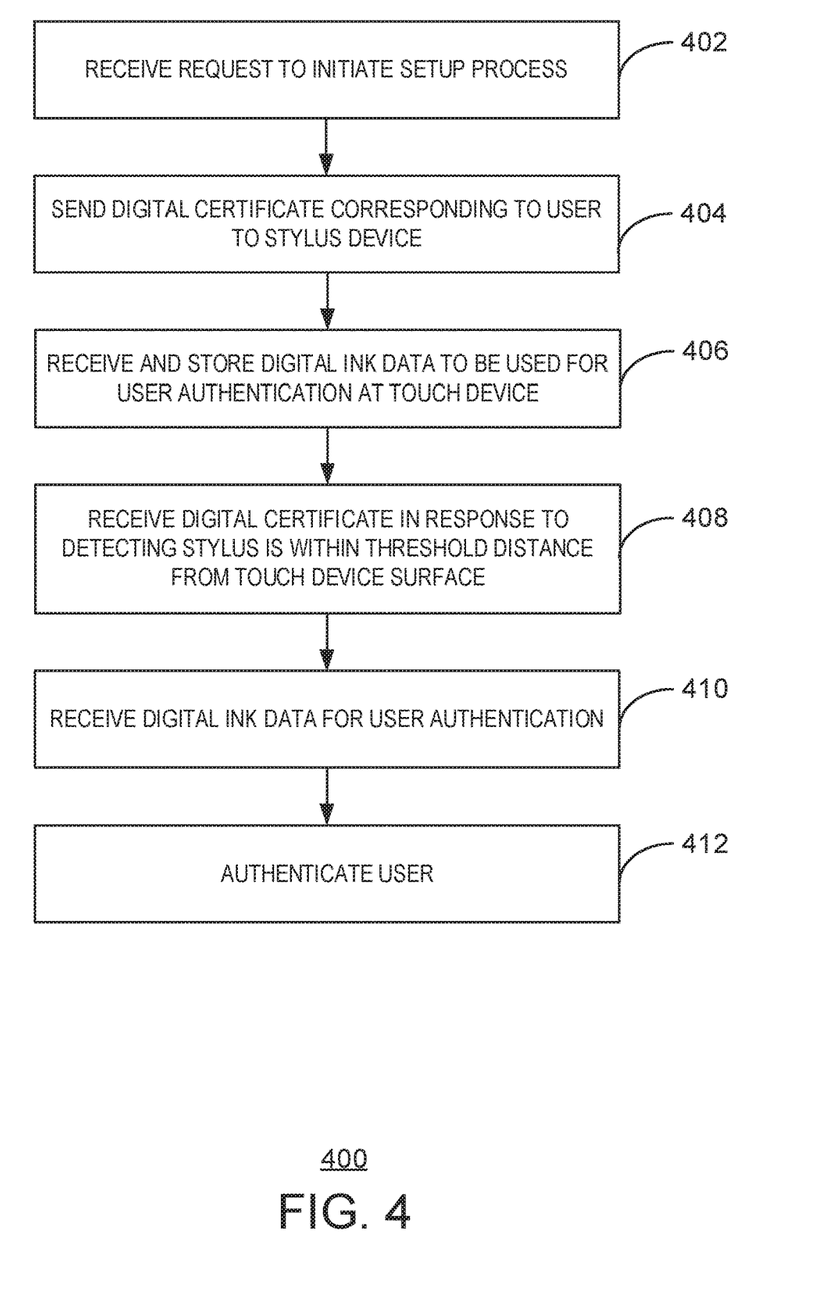
FIG. 4 is a process flow diagram of an example method for configuring and performing authentication of a user via a stylus.

FIG. 4 is a process flow diagram of an example method 400 for configuring and performing an authentication of a user via a stylus. The method 400 allows a host computing device to provide a seamless user experience. The method 400 can authenticate a user when in proximity to a host computing device. For example, the method 400 may be implemented by the system 200 described with respect to FIG. 2.

At block 402, the system receives a request to initiate a setup process. For example, the system may detect that a button has been pressed for an amount of time that exceeds a predetermined threshold time.

At block 404, the system sends a digital certificate corresponding to a user to the stylus device in response to receiving the request to initiate a setup process. For example, the digital certificate may be associated with an online ID of the user. In some examples, the digital certificate can be sent via a wireless connection, such as Bluetooth. In some examples, the digital certificate can be sent via a wired connection. For example, the stylus device may be physically coupled to the system for the setup process.

At block 406, the system receives and stores digital ink data to be used to authenticate the user at the touch device. For example, the digital ink data can include an electronic picture and/or electronic signature. In some examples, the system then associates the digital ink data with the digital certificate corresponding to the user.

At block 408, the system receives a digital certificate in response to detecting a stylus device is within a threshold distance from a touch device. In some examples, the touch device may be locked. For example, the authentication process may be initiated via a gesture such as a swipe of the stylus device across the surface of a touch screen of the system.

At block 410, the system receives digital ink data for user authentication. For example, the digital ink data can include an electronic picture and/or electronic signature.

At block 412, the system authenticates the user. For example, the system can authenticate the user based on a match of the digital ink data with the previously received digital ink data associated with the digital certificate. In some examples, once the user is authenticated, the system can be unlocked and ready for use. For example, the system can allow access to any number of applications installed on the system.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application.

Figure 5:
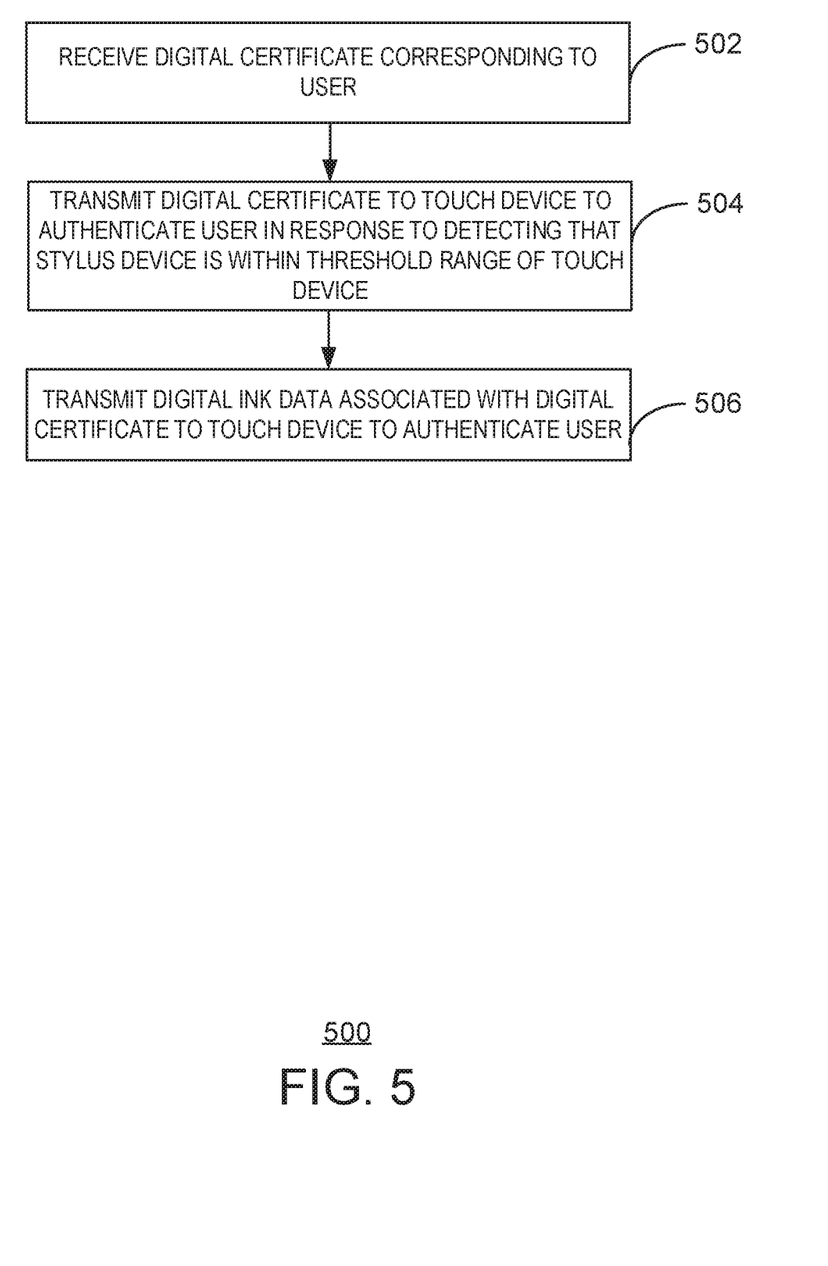
FIG. 5 is a process flow diagram of an example of a method for authenticating a user on a computing device.

FIG. 5 is a process flow diagram of an example of a method 500 for authenticating a user on a computing device. For example, the method 500 may be implemented by the stylus device 100 and computing device 114 described with respect to FIG. 1.

At block 502, the stylus device receives a digital certificate corresponding to a user. For example, the digital certificate can be received during a setup process via a wired or wireless connection. In some examples, the setup processed may be initiated via the pressing of a button for a predetermined amount of time. In some examples, the digital certificate can be preloaded onto the stylus device. For example, the stylus may have been purchased using an online ID, which can be preloaded onto the digital certificate before the stylus device is shipped out to an end user.

At block 504, the stylus device transmits the digital certificate to a touch device to authenticate the user in response to detecting that the stylus device is within a threshold range of the touch device. For example, the digital certificate may be transmitted to the touch device in response to detecting the nib of the stylus device is within the threshold range.

At block 506, the stylus device transmits digital ink data to the touch device to authenticate the user. For example, the user authentication can be a multi-factor authentication that includes use of the digital certificate and digital ink data received via the stylus device. In some examples, the digital ink data can include an electronic drawing or an electronic signature received via the stylus device.

In some embodiments, the stylus device can also authenticate the user in a second touch device based on the digital certificate using the stylus device. For example, the second touch device may be a smartphone, a laptop, or any other computing device capable of receiving stylus input.

The process flow diagram of FIG. 5 is not intended to indicate that the steps of the method 500 are to be executed in any particular order, or that all of the steps of the method 500 are to be included in every case. Further, any number of additional steps may be included within the method 500, depending on the specific application.

Figure 6:
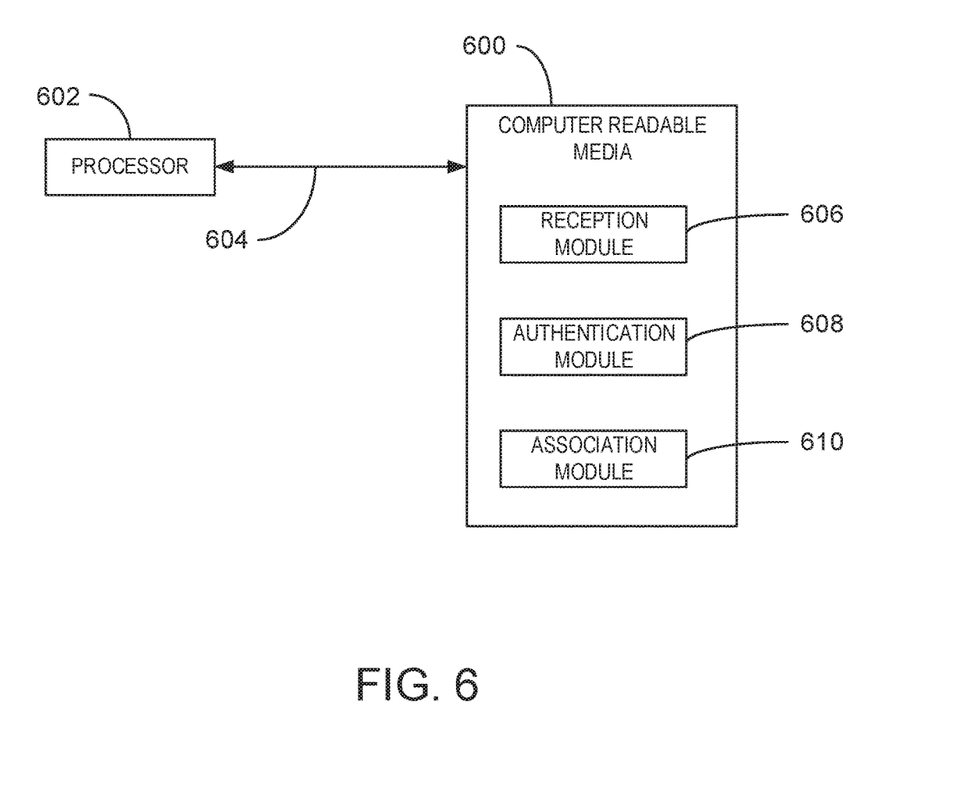
FIG. 6 is a block diagram showing a computer-readable storage media that can store instructions for authenticating a user via a stylus device.

FIG. 6 is a block diagram showing computer-readable storage media 600 that can store instructions for authenticating a user via a stylus device. The computer-readable storage media 600 may be accessed by a processor 602 over a computer bus 604. Furthermore, the computer-readable storage media 600 may include code to direct the processor 602 to perform steps of the techniques disclosed herein.

The computer-readable storage media 600 can include code such as a reception module 606 configured to direct the processor 602 to receive a digital certificate associated with a user in response to detecting a stylus device is within a threshold distance from a touch device. For example, the digital certificate may be associated with an online ID of the user. The reception module 606 can also receive digital ink data associated with the digital certificate. In some examples, the digital ink data can be an electronic drawing. In some examples, the digital ink data can be an electronic signature. The reception module 606 also receives the digital signature from the stylus device, and the processor can direct the received information be saved in storage.

Further, the computer-readable storage media 600 can include an authentication module 608 configured to direct the processor 602 to authenticate the user based on the digital certificate and the digital ink data associated with the digital certificate. In some examples, the authentication module 608 can initiate an authentication in response to detecting an unlock gesture. For example, the gesture can be a slide of a stylus device across the touch device screen. In some examples, the authentication module 608 can unlock the touch device in response to authenticating the user.

In addition, the computer-readable storage media 600 can include an association module 610. The association module 610 can receive a request to initiate a setup process and send the digital certificate corresponding to the user to the stylus device during the setup process. For example, the association module 610 may initiate the setup process in response to detecting a button press for a predetermined amount of time.

It is to be understood that any number of additional software components not shown in FIG. 6 may be included within the computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

An example stylus device includes a first module configured to receive and to store a digital certificate corresponding to a user. The example stylus device includes a second module configured to wirelessly transmit the digital certificate and digital ink data from the stylus device to a touch device for user authentication on the touch device, the touch device configured to authenticate the user at least based on the digital certificate and the digital ink data. Alternatively, or in addition, the digital ink data can include an electronic drawing or electronic signature that is associated with the digital certificate during a setup process. Alternatively, or in addition, the stylus device can further be used for authentication of the user on a second computing device. Alternatively, or in addition, the digital certificate is preloaded on the stylus device. Alternatively, or in addition, the stylus device can further include a button. A setup process can be initiated in response to detecting a press of the button for a predetermined amount of time. Alternatively, or in addition, the digital certificate and the digital ink data can be wirelessly transmitted as Human Interface Device (HID) packets. Alternatively, or in addition, the stylus device can further include a wireless radio located near a nib of the stylus device. The digital certificate and the digital ink data can be wirelessly transmitted via the wireless radio. Alternatively, or in addition, the digital certificate can include an online user ID. Alternatively, or in addition, the stylus device can further include a Bluetooth radio. The digital certificate and the digital ink data can be wirelessly transmitted via the Bluetooth radio. Alternatively, or in addition, the stylus device can further include a wired connection. The digital certificate can be received from the touch device via the wired connection during a setup process.

EXAMPLE 2

An example method includes receiving a digital certificate corresponding to a user at a stylus device. The example method includes transmitting the digital certificate and digital ink data associated with the digital certificate to a touch device to authenticate the user based at least on the digital certificate and the digital ink data in response to detecting that the stylus device is within a threshold range of the touch device. Alternatively, or in addition, the digital ink data includes an electronic drawing or an electronic signature received via the stylus device. Alternatively, or in addition, the example method can include authenticating the user in a second touch device based on the digital certificate using the stylus device. Alternatively, or in addition, the example method can include preloading the digital certificate onto the stylus device. Alternatively, or in addition, the example method can include initiating a setup process by pressing a button for a predetermined amount of time.

EXAMPLE 3

This example provides for an example one or more computer-readable memory storage devices for storing computer readable instructions that, when executed by one or more processing devices, instruct authentication of a stylus device user. The computer-readable instructions include code to receive a digital certificate associated with a user based at least on detecting that a stylus device is within a threshold distance from a touch device. The computer-readable instructions include code to receive digital ink data associated with the digital certificate. The computer-readable instructions include code to authenticate the user based on the digital certificate and the digital ink data associated with the digital certificate. Alternatively, or in addition, the computer-readable instructions can include code to unlock the touch device in response to authenticating the user. Alternatively, or in addition, the computer-readable instructions can include code to receive a request to initiate a setup process and send the digital certificate corresponding to the user to the stylus device during the setup process. Alternatively, or in addition, the computer-readable instructions can include code to initiate a setup process in response to detecting a button press for a predetermined amount of time. Alternatively, or in addition, the computer-readable instructions can include code to initiate an authentication in response to detecting an unlock gesture.

EXAMPLE 4

An example computing device for authenticating a user via a stylus device includes a first module configured to receive a digital certificate associated with the user and associated digital ink data from the stylus device. The computing device includes a second module configured to authenticate the user based on the digital certificate and the digital ink data. Alternatively, or in addition, the computing device can include a third module configured to initiate a setup process and send the digital certificate corresponding to the user to the stylus device during the setup process in response to detecting a button press on the stylus for a predetermined amount of time. Alternatively, or in addition, the computing device can include a third module configured to receive and store the digital ink data to be used for user authentication at the touch device and associate the digital ink data with the digital certificate during a setup process. Alternatively, or in addition, the digital ink data can include an electronic picture or an electronic signature. Alternatively, or in addition, the second module can further configured to unlock the computing device in response to authenticating the user.

EXAMPLE 5

An example system for authenticating a user via a stylus device includes means for receiving a digital certificate associated with the user and associated digital ink data from the stylus device. The system includes means for authenticating the user based on the digital certificate and the digital ink data. Alternatively, or in addition, the system can include means for initiating a setup process and send the digital certificate corresponding to the user to the stylus device during the setup process in response to detecting a button press on the stylus for a predetermined amount of time. Alternatively, or in addition, the system can include means for receiving and storing the digital ink data to be used for user authentication at the touch device and associate the digital ink data with the digital certificate during a setup process. Alternatively, or in addition, the digital ink data can include an electronic picture or an electronic signature. Alternatively, or in addition, the system can include means for unlocking the computing device in response to authenticating the user.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A stylus device, comprising a processor to:
   receive and store a digital certificate corresponding to a user, such that the digital certificate is preloaded on the stylus device;
   wirelessly transmit the digital certificate and digital ink data corresponding to handwriting from the stylus device to a digitizer screen of a touch device via a digitizer channel through a tip of the stylus device in response to detecting the tip of the stylus device is within a threshold hover range of the digitizer screen of the touch device; and
   wherein the touch device configured to authenticate the user at least based on the digital certificate and the digital ink data, and wherein the digital certificate comprises a user identifier.

2. The stylus device of claim 1, wherein the digital ink data comprises an electronic drawing or electronic signature that is associated with the digital certificate during a setup process.

3. The stylus device of claim 1, wherein the stylus device is to further be used for authentication of the user on a second computing device.

4. The stylus device of claim 1, further comprising a button, wherein a setup process is to be initiated in response to detecting a press of the button for a predetermined amount of time.

5. The stylus device of claim 1, further comprising a wireless radio located near a nib of the stylus device, wherein the digital certificate and the digital ink data are to be wirelessly transmitted via the wireless radio.

6. The stylus device of claim 1, wherein the digital certificate comprises an online user ID.

7. The stylus device of claim 1, further comprising a Bluetooth radio, wherein the digital certificate and the digital ink data is to be wirelessly transmitted via the Bluetooth radio.

8. The stylus device of claim 1, further comprising a wired connection, wherein the digital certificate is to be received from the touch device via the wired connection during a setup process.

9. A method, comprising:
   receiving a digital certificate corresponding to a user at a stylus device, such that the digital certificate is preloaded on the stylus device;
   transmitting the digital certificate and digital ink data corresponding to handwriting associated with the digital certificate to a digitizer screen of a touch device via a digitizer channel through a tip of the stylus device in response to detecting the tip of the stylus device is within a threshold hover range to authenticate the user based at least on the digital certificate and the digital ink data in response to detecting that the stylus device is within a threshold range of the digitizer screen of the touch device, and
   wherein the digital certificate comprises a user identifier.

10. The method of claim 9, wherein the digital ink data comprises an electronic drawing or an electronic signature received via the stylus device.

11. The method of claim 9, further comprising authenticating the user in a second touch device based on the digital certificate using the stylus device.

12. The method of claim 9, further comprising initiating a setup process by pressing a button for a predetermined amount of time.

13. One or more computer-readable memory storage devices for storing computer-readable instructions that, based on at least an execution by one or more processing devices, instruct authentication of a stylus device user, the computer-readable instructions comprising code to:
   receive a digital certificate associated with a user based at least on detecting that a stylus device is within a threshold distance from a touch device;
   receive digital ink data corresponding to handwriting associated with the digital certificate, wherein the digital certificate and the digital ink data are received digitizer screen of the touch device via a digitizer channel through a tip of the stylus device in response to detecting the tip of the stylus device is within a threshold hover range of the digitizer screen of the touch device; and authenticate the user based on the digital certificate and the digital ink data associated with the digital certificate, wherein the digital certificate comprises a user identifier.

14. The one or more computer-readable memory storage devices of claim 13, further comprising code to unlock the touch device in response to authenticating the user.

15. The one or more computer-readable memory storage devices of claim 13, further comprising code to receive a request to initiate a setup process and send the digital certificate corresponding to the user to the stylus device during the setup process.

16. The one or more computer-readable memory storage devices of claim 13, further comprising code to initiate a setup process in response to detecting a button press for a predetermined amount of time.

17. The one or more computer-readable memory storage devices of claim 13, further comprising code to initiate an authentication in response to detecting an unlock gesture.

18. A computing device for authenticating a user via a stylus device, comprising a processor to:

receive a digital certificate associated with the user and associated digital ink data corresponding to handwriting from the stylus device at a digitizer screen of a touch device via a digitizer channel through a tip of the stylus device in response to detecting the tip of the stylus device is within a threshold hover range of the digitizer screen of the touch device;

authenticate the user based on the digital certificate and the digital ink data, wherein the digital certificate comprises a user identifier used as a second factor for user authentication corresponding to one of a plurality of users of the stylus device.

19. The computing device of claim 18, wherein the processor is configured to initiate a setup process and send the digital certificate corresponding to the user to the stylus device during the setup process in response to detecting a button press on the stylus for a predetermined amount of time.

20. The computing device of claim 18, wherein the processor is configured to receive and store the digital ink data to be used for user authentication at a touch device and associate the digital ink data with the digital certificate during a setup process.

21. The computing device of claim 18, wherein the digital ink data comprises an electronic picture or an electronic signature.

22. The computing device of claim 18, wherein the processor is further configured to unlock the computing device in response to authenticating the user.

23. The computing device of claim 18, wherein threshold hover range is within a range of approximately 1.0 to 2.0 centimeters.

* * * * *